United States Patent [19]

Aultz et al.

[11] Patent Number: 4,498,567

[45] Date of Patent: Feb. 12, 1985

[54] PERIMETER GUARD FOR A MACHINE

[75] Inventors: Thomas R. Aultz, Loveland, Ohio; Charles C. Hughes, Villa Hills, Ky.; Stanley F. Humbert, Cincinnati, Ohio

[73] Assignee: R. A. Jones & Co., Inc., Covington, Ky.

[21] Appl. No.: 431,562

[22] Filed: Sep. 30, 1982

[51] Int. Cl.³ .............................................. F16P 1/00
[52] U.S. Cl. ................................... 192/133; 74/612; 53/77; 493/38; 49/445; 49/450; 49/464
[58] Field of Search ................. 74/612, 617, 608, 609; 49/450, 445, 464; 192/133, 134; 16/198; 493/38; 53/77

[56] References Cited

U.S. PATENT DOCUMENTS

| | | | |
|---|---|---|---|
| 390,919 | 10/1888 | Tuchfeld | 49/450 |
| 676,558 | 6/1907 | Hoyt | 16/198 |
| 780,840 | 1/1905 | Tracy | 49/445 |
| 2,033,086 | 3/1936 | Schunk | 49/450 |
| 2,767,426 | 10/1956 | Grupp | 16/198 |
| 2,791,796 | 5/1957 | Haas | 49/445 |
| 2,965,935 | 12/1960 | Olsen | 49/450 |
| 3,654,821 | 4/1972 | Mikulin | 74/612 |
| 3,747,274 | 7/1973 | Moorman et al. | 49/450 X |
| 3,996,815 | 12/1976 | Walker | 192/734 |
| 4,363,267 | 12/1982 | Greer | 49/445 |
| 4,392,771 | 7/1983 | Smalley | 192/133 |

Primary Examiner—Kenneth J. Dorner
Attorney, Agent, or Firm—Wood, Herron & Evans

[57] ABSTRACT

A perimeter guard for a machine wherein a plurality of vertical posts are spaced about a machine. Each post is H-shaped and has lateral flanges projecting from it to create vertical channels on each side of the post. A transparent window is slidably mounted in one set of perimeter channels to form an upper guard and a lower pannel is slidably mounted in the other set of opposed channels.

A counterbalance is provided for the windows and a detent is provided for locking the lower panels in their lowermost position or in a raised position.

7 Claims, 9 Drawing Figures

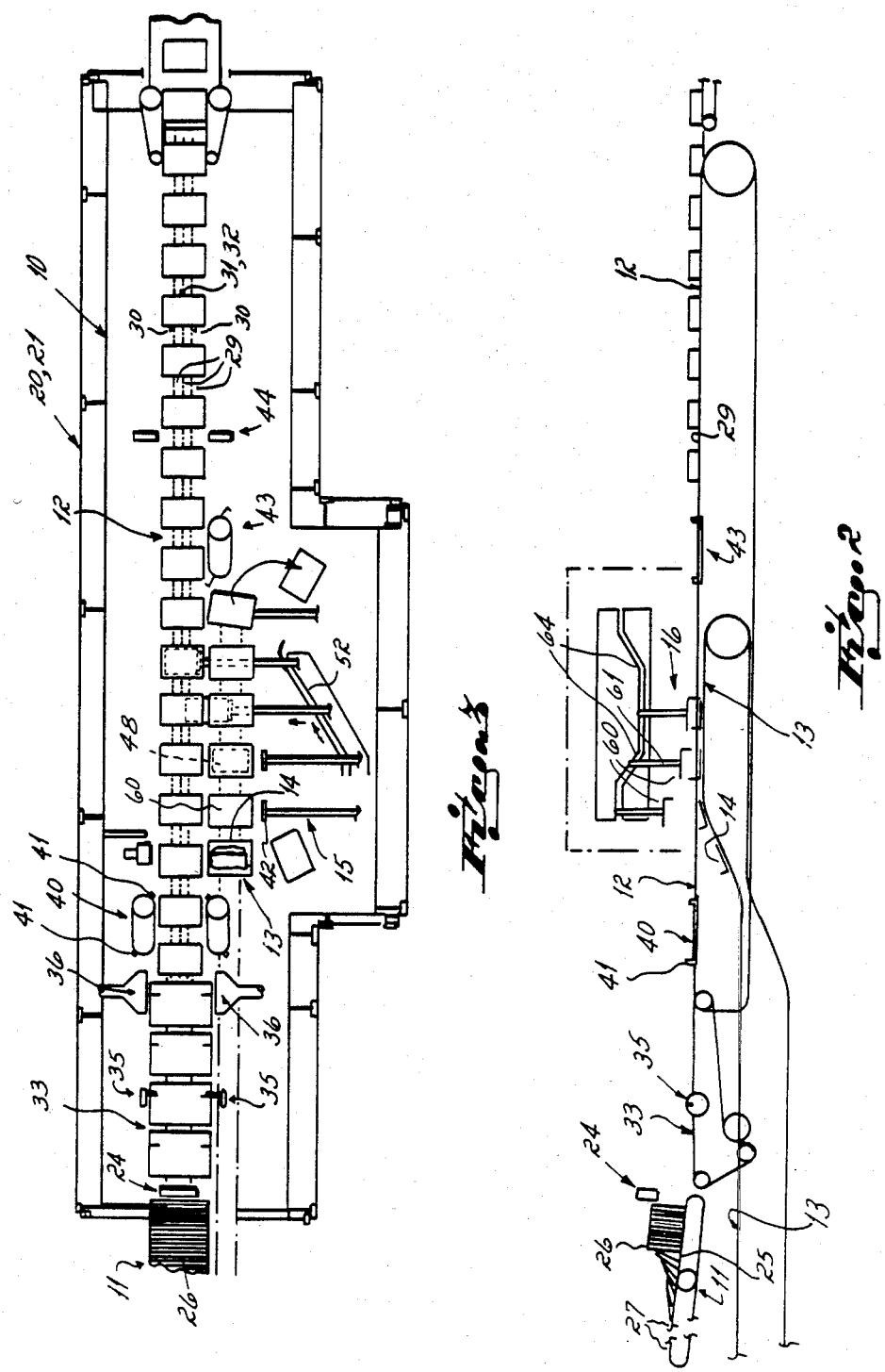

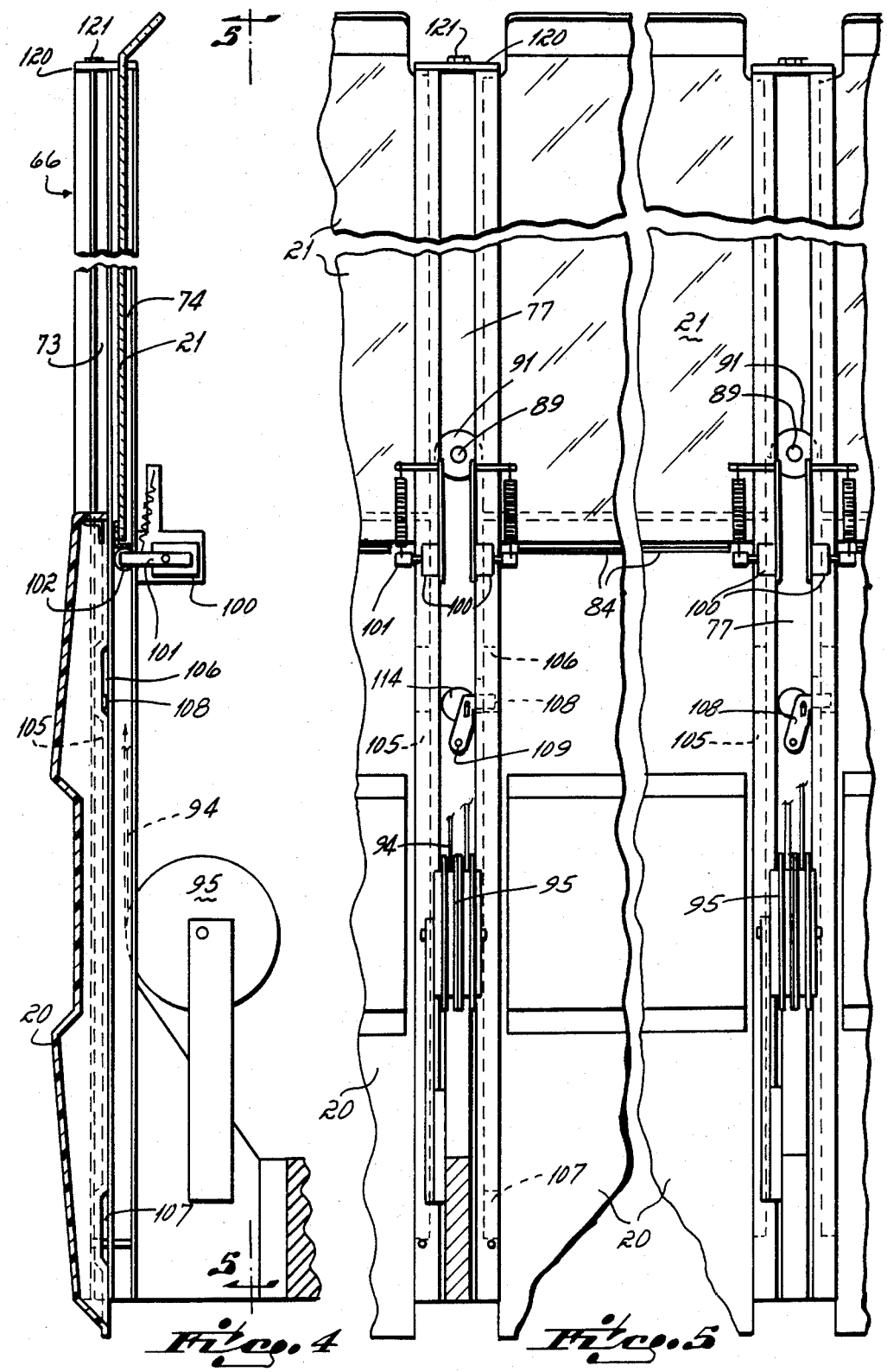

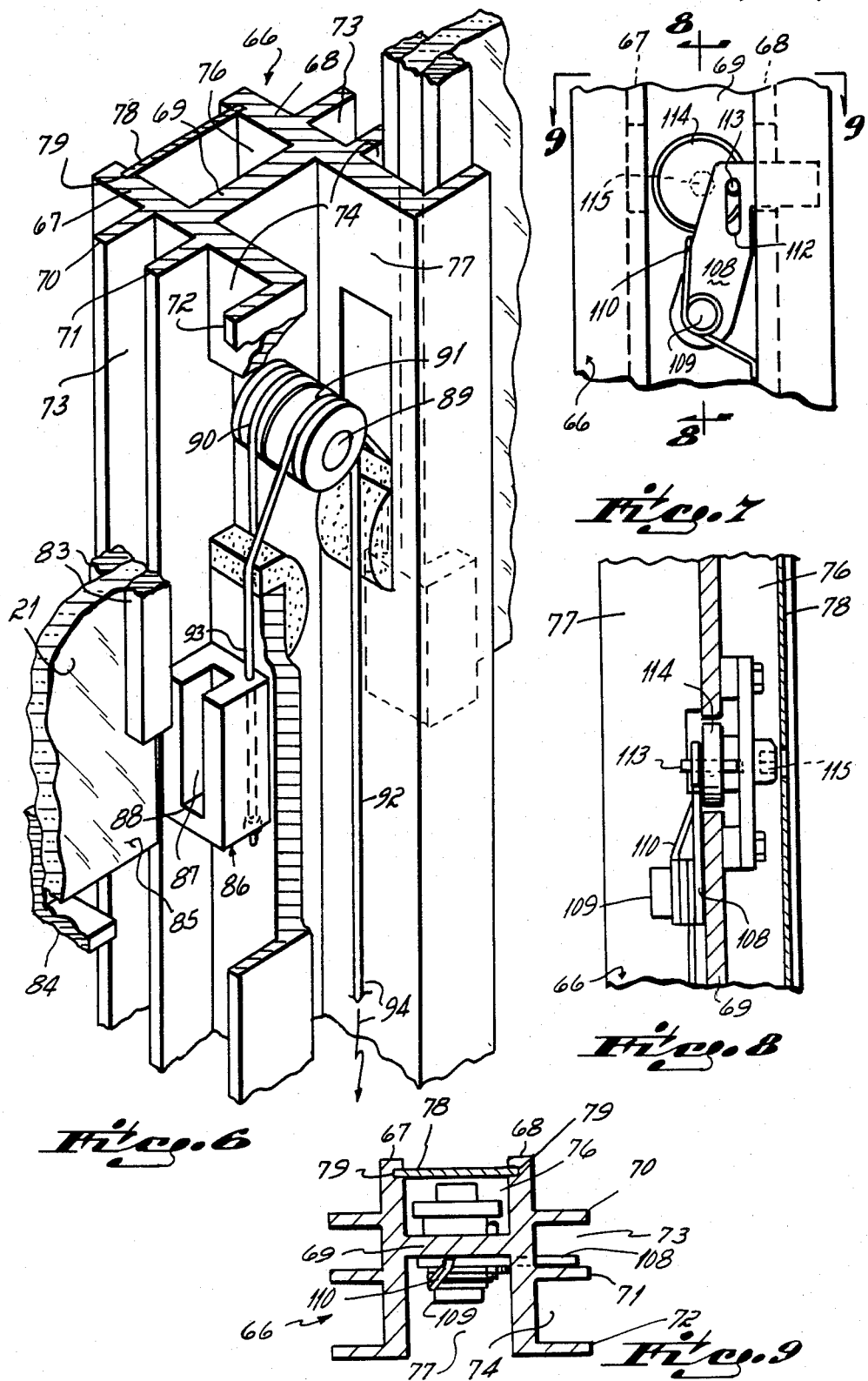

PERIMETER GUARD FOR A MACHINE

This invention relates to a perimeter guard for a machine. The invention is particularly applicable to a cartoner, but also would be useful in providing a personnel guard for other different types of machines.

The perimeter guard of the present invention lends itself particularly to a cartoner wherein frequent access is required to the upper portion of the machine but less frequent access is required for the lower portion of the machine. More particularly, a cartoner carries product in product buckets on a product bucket conveyor and carries cartons on a transport conveyor running parallel to the product bucket conveyor. A barrel loader thrusts product from each product bucket into an adjacent carton. In such a machine, mechanism is provided for opening carton flaps, tamping and/or confining the product before it is thrust into the cartoner, and closing and sealing the carton flaps. All of these operations are performed on the upper portion of the machine where they can be viewed by the machine operator. From time to time problems occur in connection with the many operations which must be performed. When those problems occur, the machine must be shut down and the operator must have access to the machine to correct the problem.

In such a cartoner, the drive train is normally mounted in the lower portion of the machine and requires much less frequent attention by the operator.

Heretofore, perimeter guards have consisted of cover plates bolted to the side frames of the machines to cover the lower portion of the machine and hinged doors mounted on the upper portion of the machine. The bolted cover plates obviously require a certain amount of time for their removal in order to provide access to the lower portion of the machine. The hinged doors are at best awkward. For example, their hinge points might be located so that they tend to swing in the wrong direction in relation to other machine components around the main machine. Because they swing out away from the machine, there is a tendency for personnel to bang into the doors as they walk around the machines. A mechanic working on the lower portion of the machine has a tendency to bang his head as he raises it into the path of the swinging door. Finally, additional space is required for the machine in that three feet or so beyond the extremity of the hinged door must be provided for personnel to pass along the perimeter of the machine.

It has been an objective of the present invention to provide improved perimeter guards which provide enhanced accessibility to the machine while substantially eliminating the problems attending the prior guard structures as referred to above.

This objective of the invention is attained by providing vertically slidable windows for the upper portion of the guard and panels for the lower portion of the guard. More particularly, extrusions, forming vertical posts, are mounted around the perimeter of the machine, each of the posts presenting two channels. In one set of opposed channels between adjacent posts a transparent window is slidably mounted and counterbalanced so that it can be lowered to provide access to a machine simply by the operator's pushing down upon it. Preferably, an interlock with the main power system to the machine is provided so that when the window is lowered, the machine is shut down.

The panels covering the lower portion of the machine are slidably mounted in the adjoining channels. A pivotable pawl is mounted on the post and is engageable with upper and lower recesses on the edges of each panel so as to block the raising of the panel and to permit the capturing and holding of the panel in a raised position. Preferably, the pawl can be operated only by the application of a tool to it thereby preventing the panels from being casually raised and lowered.

It can be seen that the guard structure of the present invention greatly facilitates access to the machine. Under normal operating conditions when the machine has relatively frequent down times for clearing jams and the like, the access to the machine is had very simply by pushing down on the window so that the operating parts of the machine in the upper portion of it are immediately available. When the fault has been cleared, the window is easily returned to its original position with an assist from the counterbalance.

Similarly, if repair or modification of the drive train is required, one or more of the lower panels can be raised by pivoting the retaining pawl and thereafter raising the panel. Panels are preferably a lightweight plastic material and need no counterbalance. While the extrusions in which the window and panel are slidably mounted are normally capped off at the top, if that cap is removed, either or both of the window and lower panel can be totally removed from the machine.

The several features and objectives of the present invention will become more readily apparent from the following detailed description taken in conjunction with the accompanying drawings in which:

FIG. 2 is a diagrammatic side elevational view of the apparatus;

FIG. 3 is a top plan view of the apparatus;

FIG. 4 is a side elevational view of one post formed in accordance with the present invention;

FIG. 5 is a front elevational view of the post as viewed in the direction of arrows 5—5;

FIG. 6 is a fragmentary perspective view of the window mount and counterbalance apparatus;

FIG. 7 is a fragmentary view of the pawl for locking the lower panels in place;

FIG. 8 is a cross-sectional view taken along lines 7—7 of FIG. 6; and

FIG. 9 is a cross-sectional view taken along lines 8—8 of FIG. 6.

GENERAL ORGANIZATION AND OPERATION

Figure 1:
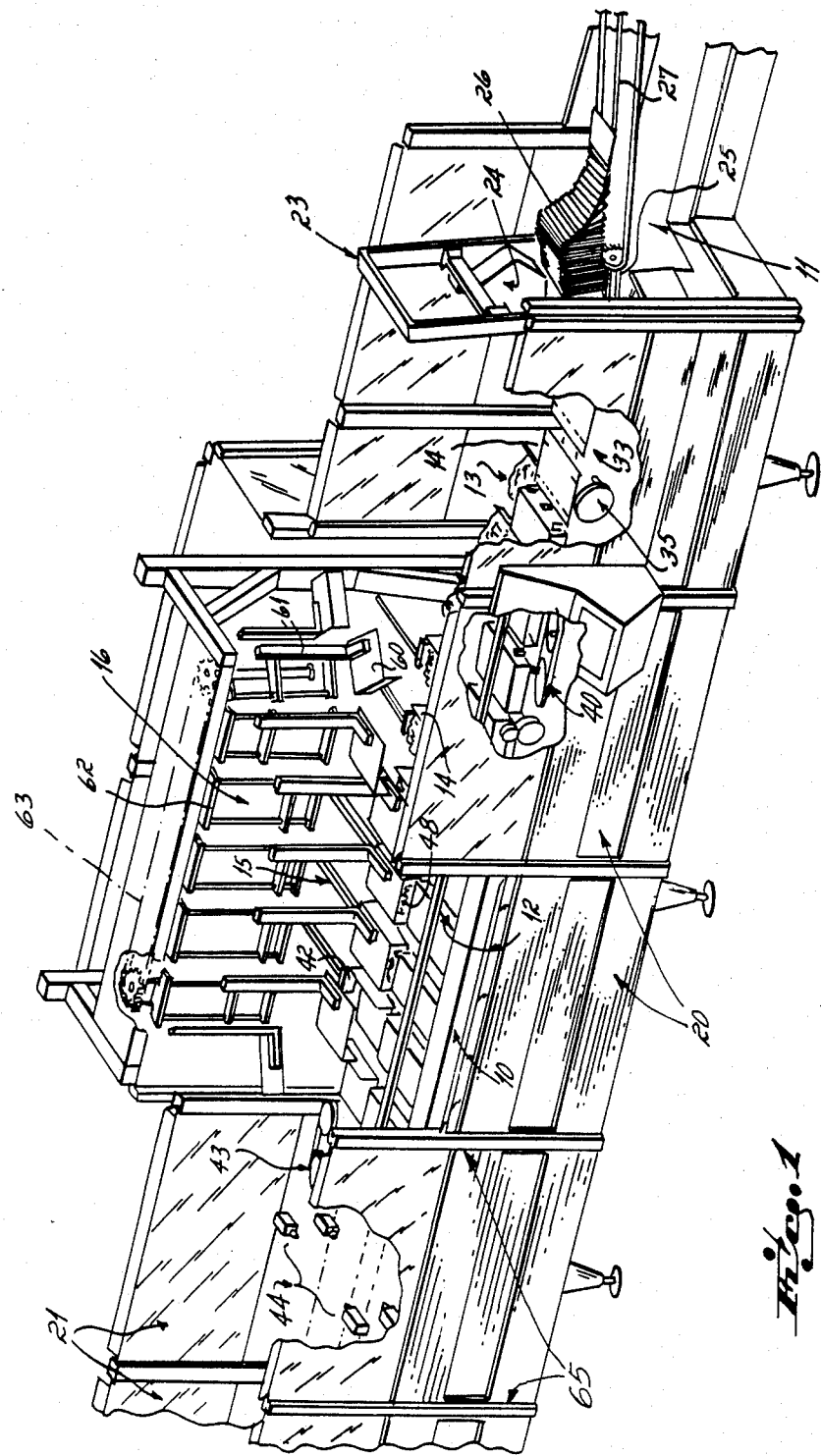
FIG. 1 is a perspective view of a cartoning apparatus employing the present invention.

A cartoner with which the present invention is employed includes a frame 10 which supports the principal operating elements. The frame supports a carton feeder 11, a carton transport conveyor 12, a product bucket conveyor 13 and product buckets 14 mounted on the conveyor and a barrel loader 15. An overhead tamper confiner 16 is employed for products which must be compressed either vertically or hoizontally or both in order to size them for introduction into the cartoner.

The cartoner is surrounded by a series of lower opaque guard panels 20 and guard windows 21 which are capable of being raised and lowered to expose the operating components of the machine for repairs, unclogging jams and the like. These will be described in detail below.

In somewhat more detail, the feeder 11 has a frame 23 which supports a rotatable feed mechanism 24 of the type disclosed in the copending application of Scarpa et al Ser. No. 276,081, filed June 22, 1981. The feeder also includes a pair of spaced parallel chains 25 on which flat folded cartons 26 are supported and gradually moved toward the rotary feeding device. The cartons 26 may be placed on the chains by an operator, they may be fed onto the chains one at a time by a vertically oriented magazine, or they may be fed onto the chains 25 by an overhead conveyor which receives the cartons from a side seam gluer, not shown.

The carton transport conveyor 12 has three elongated, parallel endless chains 29. The outboard chains support trailing transport lugs 30. The center chain 31 supports a leading transport lug 32. The center chain may be shifted with respect to the outboard chains in order to vary the spacing between the leading and trailing transport lugs in order to accommodate cartons of differing lengths (the length of the carton is the dimension in the machine direction). The cartons are fed in the flat folded condition onto the transport conveyor. Prior to being captured between the leading and trailing transport lugs of the conveyor 12, the carton is transported from the feeder by a conveyor 33. During the traverse of conveyor 33, the carton flaps are separated by a flap separator 35 which forces a lower flap downwardly into a position where it can be engaged by a stationary plough and turned and held at a 90° angle to the wall to which it is connected. The carton then moves through an air opener 36 which directs blasts of air from either side of the carton in a horizontal direction to force air between the upper and lower walls of the carton, thereby causing the carton to swing to an erect orientation between the leading and trailing lugs of the transport conveyor. That air opener is disclosed in U.S. Pat. No. 3,728,985, issued Apr. 24, 1973.

Immediately downstream of the air opener are opposed flap spreaders 40. The flap spreaders carry lugs 41 which engage the leading flap of the carton and swing it through 90° so that it can be captured by stationary rails and held in that attitude as the carton passes the barrel loader 15. The trailing flap is similarly captured by the rails and held open.

As the carton passes the barrel loader, pusher heads 42 engage products in the product buckets and thrust them across the product buckets into the opened cartons.

After the carton has been filled, it is conveyed past flap closers 43 which engage the trailing flaps and swing them to a closed position. Glue guns 44 are mounted alongside the carton conveyor downstream of the flap closers 43. The glue guns apply an appropriate pattern of glue to one of the horizontal flaps of the carton. When the glue is applied, ploughs swing the horizontal flaps to a closed position and hold them there during the brief period required for the glue to set.

The product bucket conveyor 13 consists of a pair of endless chains which support a series of spaced product buckets 14 which convey products 48 past the open cartons. The product buckets may be L-shaped as shown, or may be U-shaped depending upon the product to be filled into the carton and the need for imparting shaping to the product to enable it to conform dimensionally to the size of the carton. The barrel loader 15 diagrammatically illustrated in FIG. 3 consists of a series of pusher heads 42 which are slidably supported on endless chains. The pusher heads have cam followers which ride in a cam track 52. As the pusher heads are conveyed on the upper run of the chains which support them, the cam track 52 causes each pusher head to move across the product bucket where it engages the product 48 and thrusts it into an open carton.

In the illustrated form of the invention, the tamper confiner 16 has a series of L-shaped tamper confiner elements 60 which are carried by vertical posts 61 and supported on carriages 62. The carriages are connected to endless chains 63 mounted on horizontal sprockets, not shown, to convey the tamper confiner elements over the upper run of the product bucket conveyor adjacent the barrel loader. A cam track 64 is mounted adjacent the path of the posts 61. The posts 61 have followers which ride in the cam track to lower the tamper confiners as they pass over the product buckets and to raise them after the carton has been filled with product by the barrel loader so that they can be swung out of the way of the mechanism during their excursion around to the outside of the cartoner. The L-shaped tamper confiner elements cooperate with the L-shaped product buckets to engage the product such as a breakfast cereal pouch and to shape it into a generally rectangular cross section matching that of the interior of the carton, thereby enabling the pusher heads 42 to thrust the pouch into the cartons. If the product buckets are U-shaped, the tamper confiner may be a flat platen which simply compresses the product as, for example, facial tissues, so that vertical dimension of the product matches the dimension of the carton opening.

In the operation of the cartoner, the flat folded carton blanks are fed from the feeder 24 toward the transport conveyor. The upper and lower flaps of the carton are separated so as to permit air to be introduced between the upper and lower walls of the carton. At the air opener 36, blasts of air erect the carton between the leading and trailing transport lugs. As the cartons move downstream, the horizontal flaps are plowed up and down and the vertical flaps are swung through 90° on both sides of the carton to prepare the carton for the introduction of product.

Product which has been transferred to the product buckets is confined by the overhead tamper confiner 16 as the products pass the barrel loader 15. There, the pusher heads 42 of the barrel loader drive each product across the product bucket and into the carton opposite it as the product buckets and transport conveyors move alongside each other past the barrel loader.

After the product has been loaded into the cartons, the carton flaps have a pattern of glue applied to them and are closed and held in a closed condition until the glue sets.

The Perimeter Guard

Spaced around the machine are a plurality of posts 65, each being secured to the machine frame 10, as best shown in FIGS. 4, 6 and 9. Each post is formed as a generally H-shaped extrusion 66 having, in cross section, two legs 67, 68 interconnected by a crossbar 69. Projecting outwardly from ech leg 67 and 68 are flanges 70, 71, 72. The flanges form channels 73 and 74 on each side of the extrusion. Between the two legs 67 and 68, the crossbar 69 creates two recesses 76 and 77. A plate 78 facing outward of the machine is positioned in slots 79 in the legs 67 and 68.

The window 21 is vertically slidable in opposed channels 74 of adjacent posts. The window is normally positioned on the upper half of the posts.

Opaque panels 20 are slidable in the opposed channels 73 of adjacent posts.

As best shown in FIG. 6, each window has aluminum blocks 83 mounted on its vertical edges and an angle member 84 mounted across its lower edge. The blocks 83 terminate short of the lower edge of the window leaving an exposed corner 85. A block or saddle 86 is slidably mounted within each channel 74, the saddle 86 having a recess 87 and a bottom wall 88 at the lower end of the recess. The recess is adapted to receive the exposed corner 85 of the window when it is slid down the extrusion into position. The saddle 86 is normally located intermediate the upper and lower ends of the post so that when the window is positioned in the saddle, it extends across the upper halves of the posts. A spindle 89 is mounted in the recess 77 of the extrusion and supports two pulleys 90 and 91 for rotary movement in opposite directions. A cable 92 passes around each pulley and has one end 93 connected to the saddle 86 and the other end 94 connected to a springloaded drum 95 at the lower end portion of each post. Each spring-loaded drum, coupled with the cable and pulleys 90, 91, form a counterbalance at each lower corner of each window, the spring on each drum 95 urging the saddle to move in an upwardly direction. The loading on the springs is such that a few pounds of pressure is all that is required to slide the window to a lower position where gravity and frictional resistance of the blocks 83 on the flanges 71, 72 resist the upward movement of the window.

As best seen in FIG. 4, a switch 100 is mounted adjacent the lower end of the window when the window is raised. The switch has a pivoted arm 101 which is spring-urged to the horizontal position illustrated. The arm has a roller 102 on its end, the roller normally being engaged with the lower edge of the window. The switch 100 is connected to the main power to the machine drive and will operate to open the circuit to the main machine drive when the switch arm 101 is swung downwardly as by pushing down on the window. As the window moves down, the roller rides along the edge of the window and is maintained in a downward attitude until the window is once again raised. Thus, an interlock is formed which will cause the machine to shut down as soon as the operator begins to push down on the window.

Referring to FIGS. 4, 5 and 7, each panel 20 has side flanges 105, the side flanges having an upper recess 106 and a lower recess 107. Immediately adjacent the upper recess 106, when the panel is in a lower position, is a pawl 108. The pawl 108 is pivotally mounted in the extrusion recess 76 to pivot about a pin 109. A spring 110 normally urges the pawl toward the recess 73 in which the panel slides. The pawl has a slot 112 which is engaged by a pin 113 mounted on a disk 114. The disk 114 is fitted with a recess 115 to receive an Allen wrench so that as the disk is rotated in a clockwise direction as viewed in FIG. 7, the pin riding in the slot 112 will cause the pawl to swing away from the recess 73 and thus disengage itself from the recess 106 in the panel. The plate 78 across the recess 76 has a hole formed in it to provide a passage for the Allen wrench into the hole 115. Thus, the pawl locks the panel in its lowermost position and can be moved out of the way only by the deliberate act of inserting a tool into the disk 114. When the pawl is moved out of the way, the panel can be raised until the recess 107 moves into position adjacent the pawl with the panel thus in its raised attitude. At this point, the spring will urge the pawl into the recess 107, thereby securely holding the panel in the raised position.

Each extrusion preferably has a cap 120 secured by a bolt 121. When the cap 120 is removed, either or both of the window and panel may be slid completely out of the extrusion.

In the operation of the invention, when the machine is operating in its normal fashion the windows 26 and panels 20 are in the normal position as viewed in FIG. 1. In the event that fault occurs in the upper visible portions of the machine, the operator pushes down the window 21 adjacent the fault. This trips the switch 100 and shuts the machine down. Thereupon, the operator clears the fault. The operator then raises the window with assistance from the counterbalance into its upper position. The machine is then ready to be operated by pushing the appropriate start button.

In the event repairs or changeover are required to the drive train or the major components located at the lower portion of the machine, the appropriate panels 20 are raised. This operation is performed simply by inserting an Allen wrench into the appropriate pawl and rotating it to pull the pawl from the recess 106 on the panel. Thereafter, the panel can be raised until the recess 107 moves into position adjacent the pawl. The pawl will then move into the recess and securely hold the panel in its upper position. When the maintenance is completed, the panel is lowered as by use of an Allen wrench in the pawl as previously described.

Having described our invention, we claim:

1. In a machine having a drive train operated by a main power supply, a perimeter guard comprising,
   at least three vertical posts spaced horizontally around at least a major portion of the machine, said posts having free upper ends,
   each post having three projecting flanges forming with an adjacent post two sets of vertical facing channels on each side thereof,
   a single transparent window slidably mounted in each one set of the facing channels of adjacent posts,
   counterbalance means normally holding each window in an upper position, said window adapted to be lowered by pushing downwardly on it to expose operating mechanisms on the machine for attendance by an operator,
   panels each slidably mounted in the other set of facing channels of adjacent posts independently of said windows, said panels normally being disposed in a lower portion of said posts and being raisable to expose the drive train of the machine for maintenance work,
   and means for locking said panels in a raised position, said windows and panels being removable by raising them past the free upper ends of said posts.

2. A guard mechanism as in claim 1 in which said panel locking means comprises,
   a recess in an upper edge portion and a lower edge portion of each panel,
   a pawl mounted in each said post adjacent said upper recess when said panel is in a lowered position,
   said pawl being movable into and out of upper recess when said panel is in a lowered position, and being movable into and out of said lower recess when said panel is in a raised position whereby to maintain said panel selectively in either a raised or lowered position.

3. A guard mechanism as in claim 2 in which said pawl is pivotally mounted on said post,
   a spring urging said pawl toward a position for engaging a recess, a plate covering said pawl and having an access opening enabling said pawl to be pivoted out of engagement with said recess only with a tool applied through said opening.

4. A guard mechanism as in claim 1 in which said post is a generally H-shaped extrusion having three flanges 70, 71, 72 projecting outwardly from said extrusion to form said two channels on each side thereof,
said H-shaped extrusion creating two vertical recesses 76, 77,
said counterbalance means being located in one of said recesses,
and said locking means being located in the other of said recesses.

5. A guard mechanism as in claim 1 further comprising,
each window having a lower end,
an interlock switch mounted on each post adjacent the lower end of each window and connected to a main power supply to said machine to shut said machine down when any window is lowered.

6. A guard mechanism as in claim 1 in which said counterbalance means comprises,
each post having an upper end and a lower end,
an axle mounted on said post about midway between the upper and lower ends thereof,
a pair of pulleys mounted on said axle,
each window having a lower corner,
a cable connected to the lower corner of each window and passing over a respective pulley,
and a pair of spring biased drums below said pulleys, said cable being connected to said drums.

7. A guard mechanism as in claim 6 further comprising,
a block slidable in each window containing-channel and connected to the end of said cable, each said block having a recess and said recess having a bottom wall, said recess slidably receiving a lower corner of a window, whereby said window can be removed from said block and its channels by sliding it upwardly.

* * * * *

UNITED STATES PATENT AND TRADEMARK OFFICE
CERTIFICATE OF CORRECTION

PATENT NO. : 4,498,567
DATED : February 12, 1985
INVENTOR(S) : Thomas R. Aultz, Charles C. Hughes, Stanley F. Humbert It is certified that error appears in the above-identified patent and that said Letters Patent is hereby corrected as shown below:

Column 2, line 59, "hoizontally" should be --horizontally--

Column 3, line 35, "3,728,985" should be -- 3,728,945 --

Column 4, line 58, "ech" should be -- each --

Signed and Sealed this

Ninth Day of July 1985

[SEAL]

Attest:

DONALD J. QUIGG

Attesting Officer     Acting Commissioner of Patents and Trademarks